United States Patent [19]
Inoue et al.

[11] Patent Number: 5,837,183
[45] Date of Patent: Nov. 17, 1998

[54] GOLF BALL MOLDING METHOD AND APPARATUS

[75] Inventors: Michio Inoue; Keisuke Ihara, both of Chichibu, Japan

[73] Assignee: Bridgestone Sports Co., Ltd., Tokyo, Japan

[21] Appl. No.: 812,924

[22] Filed: Mar. 10, 1997

[30] Foreign Application Priority Data

Mar. 11, 1996 [JP] Japan .................................. 8-082120

[51] Int. Cl.$^6$ ............................. H05B 6/10; B29C 33/02
[52] U.S. Cl. .................. 264/403; 264/486; 264/328.16; 425/174.8 R; 425/547; 425/552
[58] Field of Search ................................. 264/403, 486, 264/328.16; 425/547, 548, 552, DIG. 110, DIG. 245, DIG. 246, 174, 174.8 R

[56] References Cited

U.S. PATENT DOCUMENTS

| | | | |
|---|---|---|---|
| 721,462 | 2/1903 | Richards | 264/328.16 |
| 4,340,551 | 7/1982 | Wada et al. | 264/328.16 |
| 4,940,870 | 7/1990 | Shibatba et al. | 264/486 |
| 5,062,786 | 11/1991 | Arai | 264/486 |
| 5,338,497 | 8/1994 | Murray et al. | 264/486 |
| 5,401,938 | 3/1995 | Froeschke et al. | 425/174.8 R |
| 5,483,043 | 1/1996 | Sturman, Jr. et al. | 264/486 |
| 5,591,369 | 1/1997 | Matsen et al. | 264/486 |

FOREIGN PATENT DOCUMENTS

| | | | |
|---|---|---|---|
| 55-121022 | 9/1980 | Japan | 264/403 |
| 63-67121 | 3/1988 | Japan | 264/486 |

*Primary Examiner*—Jill L. Heitbrink
*Attorney, Agent, or Firm*—Sughrue, Mion, Zinn, Macpeak & Seas, PLLC

[57] ABSTRACT

A golf ball molding apparatus includes a mold comprising a pair of upper and lower mold halves (1 and 2) adapted to be mated to define a spherical cavity therebetween, each mold half being formed of a non-magnetic material and having a thin film layer (4) of a magnetic material applied to a cavity-defining surface thereof. An induction heating coil (5) is embedded in each mold half adjacent to the thin film layer. A cooling channel (6) is extended in the mold half for passing coolant water therethrough. A high-frequency oscillator (11) is coupled to the coil (5) for generating a magnetic field having magnetic lines of force across the thin film layer whereby the thin film layer generates eddy current to heat the cavity-defining surface. Molten stock material is then injected into the cavity. Coolant water is passed through a bore of the coil and the channel for cooling the mold and the coil whereby the stock material solidifies.

10 Claims, 2 Drawing Sheets

GOLF BALL MOLDING METHOD AND APPARATUS

BACKGROUND OF THE INVENTION

1. Field of the Invention

This invention relates to a method and apparatus for molding golf balls.

2. Prior Art

Injection molding and compression molding techniques are traditionally used to mold golf balls while molds including separable upper and lower mold halves are common. The injection molding technique is to introduce a molten stock material into a mold cavity to fill the cavity therewith. When the molten material comes in contact with the mold cavity surface, the temperature of the mold cavity surface lowers. The temperature drop can result in an uneven temperature distribution in the cavity and a loss of fluidity of the molding material so that the molding material may be locally cooled and solidified at an undesired time. Such local cooling and solidification is generally prevented by heating the mold while the stock material is introduced into the mold cavity.

If the molding material is not smoothly flowing in the cavity and if the temperature distribution in the cavity is uneven, stresses generated in the molding material are confined as such within the molded part. The residual stresses trigger development of cracks on the surface and in the interior of the molded part when some external pressure is applied thereto or when the molded part contacts chemicals.

The mold is heated and maintained hot by various means of, for example, (1) arranging heaters outside the upper and lower mold halves for heating the entire mold and (2) embedding electric heaters in the mold halves below the cavity-defining surface. The heater arrangements (1) and (2), however, suffer from several problems. Although the mold temperature can be increased to a sufficient level to improve the flow of the molding material, it takes a long time to heat the mold to the predetermined temperature because of low thermal efficiency. Since the entire mold including a cavity-defining surface portion is heated, it takes a long time to cool and solidified the molding material in the mold cavity after it is introduced and filled in the cavity. This interferes with continuous manufacture, leading to a drop of productivity. Also the outer surface of the mold is heated hot, imposing hazards to the worker.

There is a desire to have a golf ball molding method and apparatus using a mold which is improved in thermal efficiency in that only a cavity-defining surface portion can be briefly heated to a predetermined temperature while the mold temperature can be quickly lowered after a molding material has been introduced into the mold cavity.

SUMMARY OF THE INVENTION

An object of the present invention is to provide a golf ball molding method and apparatus using a mold which is improved in thermal efficiency in that only a cavity-defining surface can be briefly heated to a sufficient temperature to maintain the smooth flow of a molding material, reduce residual stresses in a molded part, and improve pattern transfer upon molding. Another object of the present invention is to provide such a golf ball molding method and apparatus capable of molding golf balls of quality while featuring productivity and safety.

In one aspect, the invention is directed to a method for molding a golf ball using a mold comprising a pair of upper and lower mold halves each defining a hemi-spherical cavity. When mated, the mold halves define a spherical cavity therebetween. Briefly stated, the invention provides a golf ball molding method comprising the steps of induction heating only cavity-defining surface portions of the mold halves and introducing a molten stock material into the cavity.

Specifically, the invention provides a method for molding a golf ball using a mold comprising a pair of upper and lower mold halves adapted to be mated to define a spherical cavity therebetween, each mold half being formed of a non-magnetic material and having a thin film layer of a magnetic material applied to a cavity-defining surface and a mating surface thereof, an induction heating coil embedded in each the mold half in electromagnetic induction relation to the thin film layer, and a high-frequency oscillator coupled to the coil. The method includes the steps of energizing the high-frequency oscillator for causing the coil to generate a magnetic field having magnetic lines of force across the thin film layer, thereby causing the thin film layer to generate eddy current to heat a cavity-defining surface portion of each mold half to a predetermined temperature, and introducing a predetermined amount of a molten stock material into the cavity to fill the cavity therewith. When the molten stock material is introduced into the cavity, the cavity-defining surface portion is preferably heated to a temperature which is equal to or higher than the glass transition temperature of the stock material.

In another aspect, briefly stated, the invention provides a golf ball molding apparatus comprising a mold comprising a pair of upper and lower mold halves adapted to be mated to define a spherical cavity therebetween, means for induction heating cavity-defining surface portions of the mold halves, means for introducing a molten stock material into the cavity, and means for cooling the mold and the induction heating means.

Specifically, the invention provides a golf ball molding apparatus comprising a mold comprising a pair of upper and lower mold halves adapted to be mated to define a spherical cavity therebetween, each the mold half being formed of a non-magnetic material and having a thin film layer of a magnetic material applied to a cavity-defining surface thereof; an induction heating coil embedded in each the mold half adjacent to the thin film layer, the coil including a hollow copper pipe and a conductor spirally wound on the pipe; a cooling channel extended in each the mold half adjacent to the thin film layer for passing coolant water therethrough; a high-frequency oscillator coupled to the coil for energizing the coil to generate a magnetic field having magnetic lines of force across the thin film layer whereby the thin film layer generates eddy current to heat the cavity-defining surface to a predetermined temperature; and means for passing coolant water through the hollow pipe of the coil and the cooling channel for cooling the mold and the coil. The induction heating coil is preferably juxtaposed to the cooling channel.

As mentioned above, the golf ball molding method and apparatus according to the invention utilize the magnetic force generated by high frequency induction for heating the mold cavity. Then the thin film layer of magnetic material formed on the cavity-defining surface can be selectively heated to a desired temperature. In this heating process, the thin film layer of magnetic material is placed in a cyclically varying magnetic field developed by conducting high-frequency current across the induction heating coil, whereby eddy current is generated in the thin film layer to heat the thin film layer itself. Then only a portion of the mold half adjacent to the cavity-defining surface is heated. This means high thermal efficiency to generate a large amount of heat in the relevant region as compared with heating by conventional electric heaters. The cavity-defining surface portion can be heated to a desired temperature within a short time.

Since the molding material as introduced into the thus heated cavity flows well, the molding material is prevented from being locally cooled and solidified by an undesirable drop or an uneven distribution of temperature. When a cover stock is molded over a core to form a thin cover, the cover can be molded to a uniform thickness. Transfer of the negative cavity pattern to the ball surface is improved. During molding, the molding material can faithfully follow a fine negative cavity pattern corresponding to a multiplicity of fine dimples on the golf ball surface, preventing defects such as flow marks and weld marks from appearing on the surface as a result of shortage of flow. A golf ball of quality can thus be molded.

According to the invention, the mold is mainly made of a non-magnetic material except for a cavity-defining surface portion made of a magnetic material. The cavity-defining surface portion with which a molding material is to come in direct contact can be rapidly heated. Since the majority of the mold made of non-magnetic material is by no means heated, the invention avoids the inconvenience that the entire mold becomes hot. As a consequence, the time taken for the molded part to cool and solidify after the molding material has been introduced into the cavity can be reduced. This feature enables continuous large scale manufacture and ensures high production efficiency. Since the outside surface of the mold does not become hot, the invention insures safety for the worker.

Additionally, the molding material is improved in flow to prevent the stresses generated in the molding material from being confined as residual stresses in the molded part. This prevents cracks from developing on the surface and in the interior of the molded part upon application of some external forces.

BRIEF DESCRIPTION OF THE DRAWINGS

These and further features of the present invention will be apparent with reference to the following description and drawings, wherein.

DESCRIPTION OF THE PREFERRED EMBODIMENTS

Figure 1:
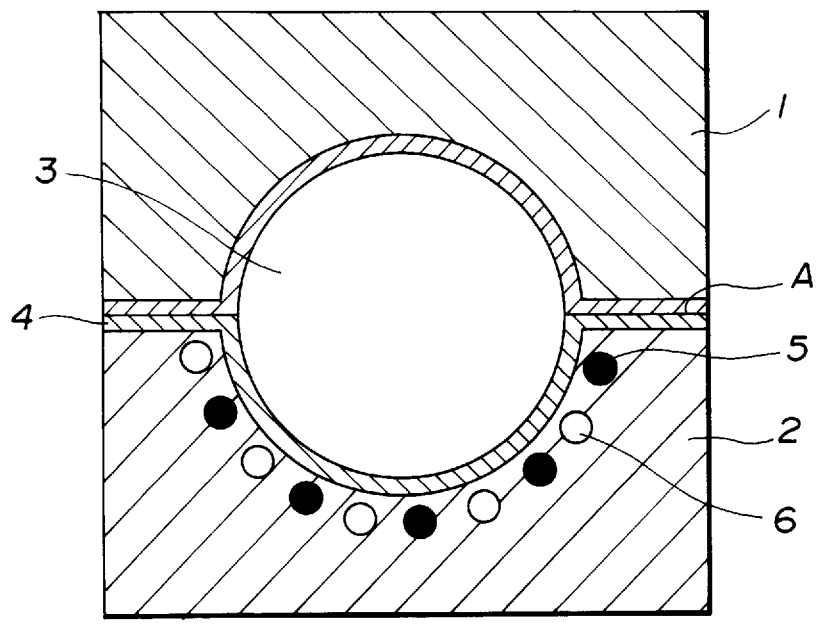
FIG. 1 is a schematic cross-sectional view of a mold according to one embodiment of the invention.

Referring to FIG. 1, there is illustrated a golf ball molding mold according to one embodiment of the invention.

The mold includes an upper mold half 1 defining a hemi-spherical cavity opening downward and a lower mold half 2 defining a hemi-spherical cavity opening upward. Each mold half has a mating or parting flat surface A around the cavity. The mold halves 1 and 2 are separable and mated together at the parting surface A to define a spherical cavity 3 therebetween. Since the upper and lower mold halves are of the same structure insofar as they constitute the invention, only the lower mold half 2 is described hereinafter.

A thin film layer 4 of a magnetic material extends on a cavity-defining hemi-spherical surface and a parting flat surface of the mold half 2. The magnetic material used herein may be any of iron base steel stocks, for example, shape steel stocks including SC steel stocks such as S45C and S55C and prehardened steel stocks (e.g., NAK steel). It is preferred for economy and durability that the magnetic layer 4 has a thickness of 0.5 to 10 mm, especially 0.5 to 5 mm although the thickness of the magnetic layer is not critical. A magnetic layer with a thickness of less than 0.5 mm would make it difficult to reproduce distinct dimple profiles whereas a magnetic layer with a thickness of more than 10 mm would slow down the heating rate. The portion of the mold which need not be heated is formed of any well-known material. Typically a non-magnetic material is selected from the working and safety standpoints. Useful examples of the non-magnetic material include metals such as copper, aluminum, and beryllium, and alloys based on these metals such as brass and beryllium copper. Although ceramics, glass and wood are included in the category of non-magnetic material, they are not necessarily recommended as the mold material because their durability and heat transfer are low.

Since the cavity-defining surface portion of the mold half is formed of a magnetic material which can be high-frequency induction heated and the portion of the mold half which need not be heated is formed of a non-magnetic material, only the cavity-defining surface portion of the mold half can be heated to a desired temperature within a short time and the time taken for cooling and solidification of molding material can be reduced.

Figure 2:
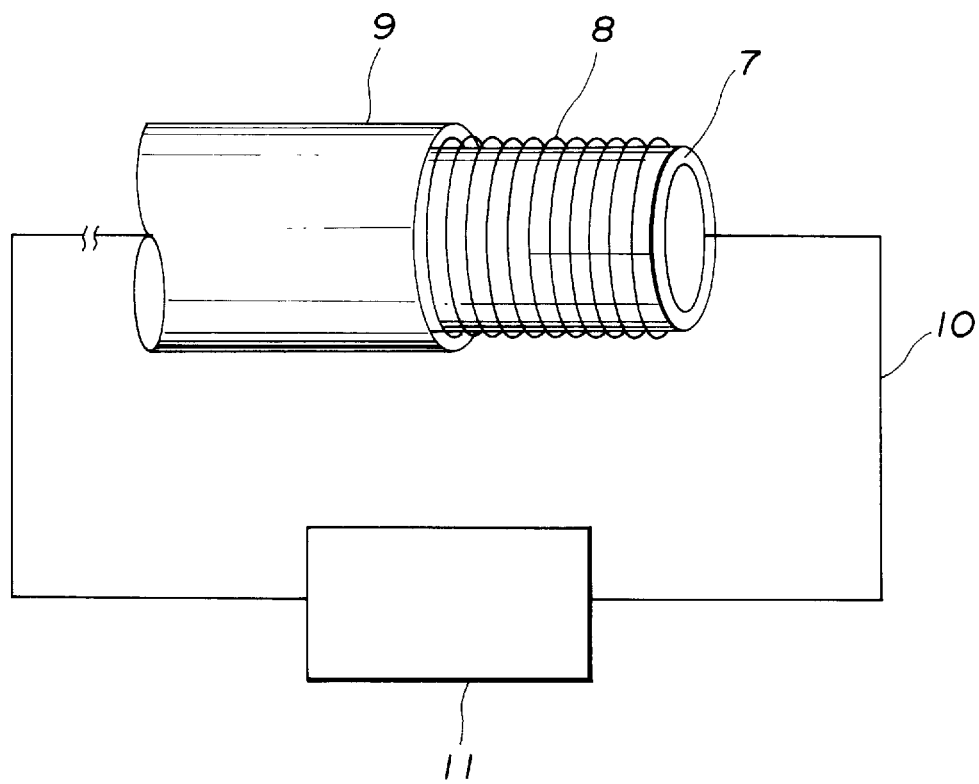
FIG. 2 is an enlarged perspective view of the induction heating coil used in the embodiment of FIG. 1.

An induction heating coil 5 is embedded in the lower mold half 2 adjacent to the thin film layer 4. A cooling channel 6 is extended in the mold half 2. As shown in FIG. 2, the induction heating coil 5 includes a hollow copper pipe 7 having a diameter of 4 to 10 mm, especially 4 to 8 mm and a conductor 8 spirally wound on the pipe at a pitch of 3 to 5 mm. The pipe 7 is enclosed with a sheath 9 of a heat resistant insulator such as epoxy resin. A coolant, typically water or oil can be passed through the bore of the pipe 7 so that the temperature of the coil 5 can be rapidly lowered after the cavity has been filled with the molding material. The coil conductor 8 has opposite ends connected across a high-frequency oscillator 11 through a conductor 10. It is noted that either one coil or a plurality of coils may be used as long as the coil or coils extend adjacent to the hemi-spherical cavity surface.

The cooling channel 6 is extended in the mold half 2 adjacent to the thin film layer 4 for the purpose of rapidly cooling the mold and the molded part. To this end, means for pumping a coolant such as water through the channel 6 in a circulating manner is preferably used. The pumping means may also serve to feed the coolant to the hollow pipe 7 of the coil 5. The cooling channel 6 preferably has a diameter of 4 to 15 mm. Further preferably the induction heating coil 5 is alternately juxtaposed to the cooling channel 6 as in the illustrated embodiment.

The oscillation mode of the high-frequency oscillator 11 is not critical and any of electric generator, electron tube and thyristor inverter type oscillators may be used. Typical high-frequency oscillators produce an output of about 1 to 5,000 kW at a frequency of 50 Hz to 10 MHz, especially 1 to 1,000 kHz.

On use of the molding apparatus of the invention, the high-frequency oscillator 11 which is coupled to the coil 5 is energized to conduct high-frequency current across the coil 5 for generating a magnetic field having magnetic lines of force across the thin film layer 4. On absorbing magnetic lines of force, the thin film layer 4 generates eddy current to heat the cavity-defining surface portion of the mold half to a predetermined temperature. While the cavity-defining surface portion is heated hot, a suitable amount of stock material is introduced into the cavity to fill the cavity therewith. On actuation of the oscillator, the thin film layer 4 (that is, the cavity-defining surface portion) is heated usually at a rate of at least 80° C./min., preferably at least 480° C./min., more preferably at least 1,200° C./min. although the heating rate depends on a particular stock material to be molded. The ultimate temperature is preferably equal to or higher than the glass transition temperature of the stock material. The molding apparatus can maintain the ultimate temperature constant while the stock material is being introduced into the cavity to fill the cavity therewith.

After the cavity has been filled with the molten stock material, the pumping means is operated to feed water through the hollow pipe 7 and the channel 6 to rapidly cool the stock material and the mold, thereby producing a golf ball.

According to the invention, only the cavity-defining surface portion is heated whereas the mold as a whole is not heated hot as mentioned above. The cooling time can be reduced and production efficiency is improved. Since the entire cavity surface can be uniformly preheated to a temperature equal to or higher than the glass transition temperature of stock material, the flow of the molten stock material is improved when it is introduced into the cavity. A golf ball surface having a multiplicity of fine dimples can be reproduced to a high degree of transfer. The smooth flow is also effective for preventing development of residual stresses. Golf balls of quality are thus molded.

Although the injection molding technique is described, a heat compression molding technique is also applicable to the golf ball molding apparatus of the invention. The invention is advantageous in injection molding a cover on a core to form a golf ball. The cover used herein may have a gage of about 0.5 to 4 mm while a thin cover having a gage of about 0.5 to 1.0 mm can be advantageously formed by the invention.

The type of the golf ball which can be molded according to the present invention is not critical. Either solid golf balls including one-, two- and three-piece golf balls or wound golf balls may be molded. The invention is advantageous when applied to injection mold the cover of two- or multi-piece solid golf balls and wound golf balls. The cover stock used herein is not critical as long as it is injection moldable.

The golf balls molded according to the invention have the above-mentioned construction while their diameter, weight, and other parameters are selected to comply with the Rules of Golf, namely a diameter of not less than 42.67 mm and a weight of not greater than 45.93 grams.

The golf ball molding method and apparatus according to the invention have the following advantages.

(1) Heating by high-frequency electromagnetic induction is highly efficient and allows only a mold cavity-defining surface portion to be selectively heated within a short time. Better transfer is ensured. A golf ball cover of a uniform reduced gage can be molded.

(2) Since the flow of molding material is improved, the molded part has few surface defects such as flow marks and weld lines and is substantially free of residual stresses. A golf ball of quality is obtainable.

(3) Since the cavity-defining surface portion of the mold is constructed by magnetic material and the remainder of the mold is constructed by non-magnetic material, only the cavity-defining surface portion can be heated to a desired temperature within a short time without heating the entire mold. As a consequence, the cooling/solidifying time is reduced, resulting in improved production efficiency.

Although some preferred embodiments have been described, many modifications and variations may be made thereto in the light of the above teachings. It is therefore to be understood that within the scope of the appended claims, the invention may be practiced otherwise than as specifically described.

We claim:

1. A method for molding a golf ball using a mold having a pair of upper and lower mold halves adapted to be mated to define a spherical cavity therebetween, each mold half being formed of a non-magnetic material and having a layer of a magnetic material having a thickness of 0.5 to 5 mm applied to a cavity-defining surface and a mating surface thereof, an induction heating coil embedded in each said mold half in electromagnetic induction relation to the layer, said coil including a hollow copper pipe and a conductor spirally wound on the pipe, a cooling channel extended in each of said mold halves adjacent to the layer and being juxtaposed to said induction heating coil having said hollow copper pipe, and a high-frequency oscillator coupled to said coil, said method comprising the steps of;

energizing the high-frequency oscillator for causing the coil to generate a magnetic field having magnetic lines of force across the layer, thereby causing the layer to generate an eddy current to heat a cavity-defining surface portion of each mold half to a predetermined temperature, introducing a predetermined amount of a molten stock material into the cavity to fill the cavity therewith, and feeding a coolant through said hollow copper pipe and said cooling channel to rapidly cool said molten stock material and the mold.

2. The method of claim 1 wherein when the molten stock material is introduced into the cavity, the cavity-defining surface portion is heated to a predetermined temperature which is not lower than the glass transition temperature of the stock material.

3. A method for molding a golf ball according to claim 1 wherein the step of energizing the high-frequency oscillator produces an output in the range of 1 to 5,000 kw at a frequency of 50 Hz to 10 MHz.

4. A method for molding a golf ball according to claim 1 wherein said cavity-defining surface portions is heated at a rate of at least 80° C./min.

5. A method of molding a golf ball according to claim 1 wherein said coolant is water.

6. A golf ball molding apparatus comprising;

a mold comprising a pair of upper and lower mold halves adapted to be mated to define a spherical cavity therebetween, each mold half being formed of a non-magnetic material and having a layer of a magnetic material having a thickness of 0.5 to 5 mm applied to a cavity-defining surface thereof, an induction heating coil embedded in each of said mold halves formed of the non-magnetic material adjacent to the layer formed of the magnetic material, said coil including a hollow copper pipe for passing a coolant therethrough and a conductor spirally wound on the pipe, a cooling channel for passing coolant therethrough extended in each said mold half adjacent to the layer and being juxtaposed to said induction heating coil having said hollow copper pipe, a high-frequency oscillator coupled to said coil for energizing the coil to generate a magnetic field having magnetic lines of force across the layer whereby, the layer generates an eddy current to heat the cavity-defining surface to a predeterminedtemperature, and means for passing coolant through the hollow pipe of said coil and said cooling channel for cooling said mold and said coil.

7. The golf ball molding apparatus of claim 6 wherein said induction heating coil extends adjacent to the hemispherical cavity surface.

8. The golf ball molding apparatus of claim 6 wherein said induction heating coil comprises a hollow copper pipe having a diameter in the range of 4 to 10 mm and said conductor is spiral wound on said pipe at pitch of 3 to 5 mm.

9. The golf ball molding apparatus of claim 8 wherein said copper pipe and said conductor are covered with a heat insulating sheath.

10. The golf ball molding apparatus of claim 6 wherein said cooling channel has a diameter in the range of 4 to 15 mm.

* * * * *